United States Patent [19]

Morita et al.

[11] 4,437,310
[45] Mar. 20, 1984

[54] TANDEM MASTER CYLINDER WITH A PRESSURE REGULATING VALVE FOR AN AUTOMOTIVE VEHICLE BRAKE SYSTEM

[75] Inventors: Katuhiro Morita, Yokohama; Hitoshi Kubota, Fujisawa, both of Japan

[73] Assignee: Nissan Motor Company, Limited, Yokohama, Japan

[21] Appl. No.: 256,487

[22] Filed: Apr. 22, 1981

[30] Foreign Application Priority Data

Apr. 24, 1980 [JP] Japan .............................. 55-55199[U]

[51] Int. Cl.³ .............................................. B60T 11/20
[52] U.S. Cl. .......................................... 60/562; 60/591
[58] Field of Search .................. 60/562, 591; 303/6 C

[56] References Cited

U.S. PATENT DOCUMENTS

| 3,232,628 | 2/1966 | Brand | 60/562 |
| 3,312,062 | 4/1967 | MacDuff | 60/562 |
| 4,253,306 | 3/1981 | Kuroki | 60/562 |
| 4,254,624 | 3/1981 | Gaiser | 60/574 |
| 4,255,932 | 3/1981 | Riedel | 60/562 |

FOREIGN PATENT DOCUMENTS

965736 8/1964 United Kingdom .
2004009 3/1979 United Kingdom .

*Primary Examiner*—Abraham Hershkovitz
*Attorney, Agent, or Firm*—Schwartz, Jeffery, Schwaab, Mack, Blumenthal & Koch

[57] ABSTRACT

A tandem master cylinder has a primary and secondary pistons disposed within cylinder bore formed in a cylinder housing, in tandem relationship. The secondary cylinder is formed with a longitudinally extending bore in which is disposed a pressure regulating valve. The pressure regulating valve has a variable set pressure which defines a split point with respect to the pressure applied to the front and rear wheel cylinders. The pressure regulating valve includes a member for varying the set pressure in response to damage to the hydraulic circuit of the front wheel cylinders for setting the split point higher than in the normal state.

18 Claims, 6 Drawing Figures

TANDEM MASTER CYLINDER WITH A PRESSURE REGULATING VALVE FOR AN AUTOMOTIVE VEHICLE BRAKE SYSTEM

BACKGROUND OF THE INVENTION

The present invention relates generally to a master cylinder for a hydraulic brake system of an automotive vehicle. More specifically, the invention relates to a tandem piston master cylinder having a primary piston and a secondary piston in tandem relationship and arranged to independently supply the working fluid to front and rear wheel cylinders.

Brake system master cylinders having primary pistons for supplying working fluid to rear wheel cylinders and secondary pistons for supplying working fluid to the front wheel cylinders are well known. In such master cylinders, the primary piston and the secondary piston are positioned in a housing in a tandem relationship so that they can be operated cooperatively by the application of a brake pedal. As is well known with such arrangements, the load applied to the front wheels is greater than that applied to this phenomenon has been known as nose dive and can lead to locking of the rear wheels prior to locking of the front wheels and thus to skidding of the vehicle. As the result of the rear wheels locking prior to the front wheels, the vehicle tends to spin about the front wheels.

To prevent a vehicle from spinning caused by rear wheel lock, brake systems have been developed having proportioning valves in the hydraulic circuit for the rear wheel brakes. This results in increasing of the cost of the brake system and makes the hydraulic circuit for the brake system so complicated that it becomes difficult to assemble and maintain.

SUMMARY OF THE INVENTION

Therefore, it is an object of the present invention to provide a tandem piston master cylinder brake system with a simplified hydraulic circuit capable of effectively preventing the rear wheels from skidding.

Another and more specific object of the present invention is to provide a tandem piston master cylinder having a device for relieving the working fluid pressure when the hydraulic pressure applied to the rear wheel cylinder exceeds a predetermined value.

A further object of the present invention is to provide a tandem master cylinder capable of operation even if the hydraulic circuit of front or rear wheel cylinders becomes damaged.

To accomplish the above-mentioned and other objects, there is provided a tandem piston master cylinder which has a primary and secondary pistons disposed a cylinder bore in a cylinder housing in tandem relationship. The secondary cylinder is formed with a longitudinally extending bore having a pressure regulating valve. The pressure regulating valve has a variable set pressure which defines a split point with regard the pressure applied to the front and rear wheel cylinders. The pressure regulating valve includes a member for varying the set pressure in response to damage in the hydraulic circuit of the front wheel cylinders to set the split point higher than the normal state.

According to a preferred embodiment of the present invention, a tandem piston master cylinder in a hydraulic brake system for an automotive vehicle comprises a cylinder housing having an axially extending bore therein, primary and secondary pistons disposed within said cylinder housing bore in a tandem relationship and cooperative to move in tandem with each other in response to application of a force to a brake pedal. Primary and secondary pressure chambers are defined within the bore by the primary and secondary pistons. The primary pressure chamber is positioned between the primary and secondary pistons and the secondary pressure chamber is located between an end the cylinder housing bore and the secondary piston and communicates with front wheel cylinders via a secondary port opening. A fluid reservoir communicates with the primary and secondary pressure chamber for supplying working fluid thereto, and a pressure regulating valve assembly is provided in the secondary piston. The valve assembly includes a bore in the secondary piston which extends along a longitudinal axis thereof, and a thrusting cylinder having an axially extending opening therein and an annular projecting portion which defines first and second chambers between the outer periphery of the thrusting cylinder and the internal periphery of the secondary piston bore. A valve member and a valve seat are incorporated with the thrusting cylinder for joint movement, the first chamber communicates with the primary pressure chamber via the opening and a space between the valve member and the valve seat. The thrusting cylinder is movable between a first initial position where the valve seat is spaced from the valve member to permit fluid flow and a second position where it abuts the valve seat to the valve member to block fluid flow. The thrusting cylinder is responsive to the pressure difference between the first chamber and said opening to alternate the valve position between the first and second positions. A primary port communicates with both the front wheel cylinders and the first chamber through a radial passage formed in the secondary piston.

BRIEF DESCRIPTION OF THE DRAWINGS

The present invention will become more fully understood from the detailed description given hereinbelow and from the accompanying drawings of the preferred embodiment of the present invention, which however, should not be taken as limitative to the present invention but for elucidation and explanation only.

In the drawings.

DESCRIPTION OF THE PREFERRED EMBODIMENT

Figure 1:
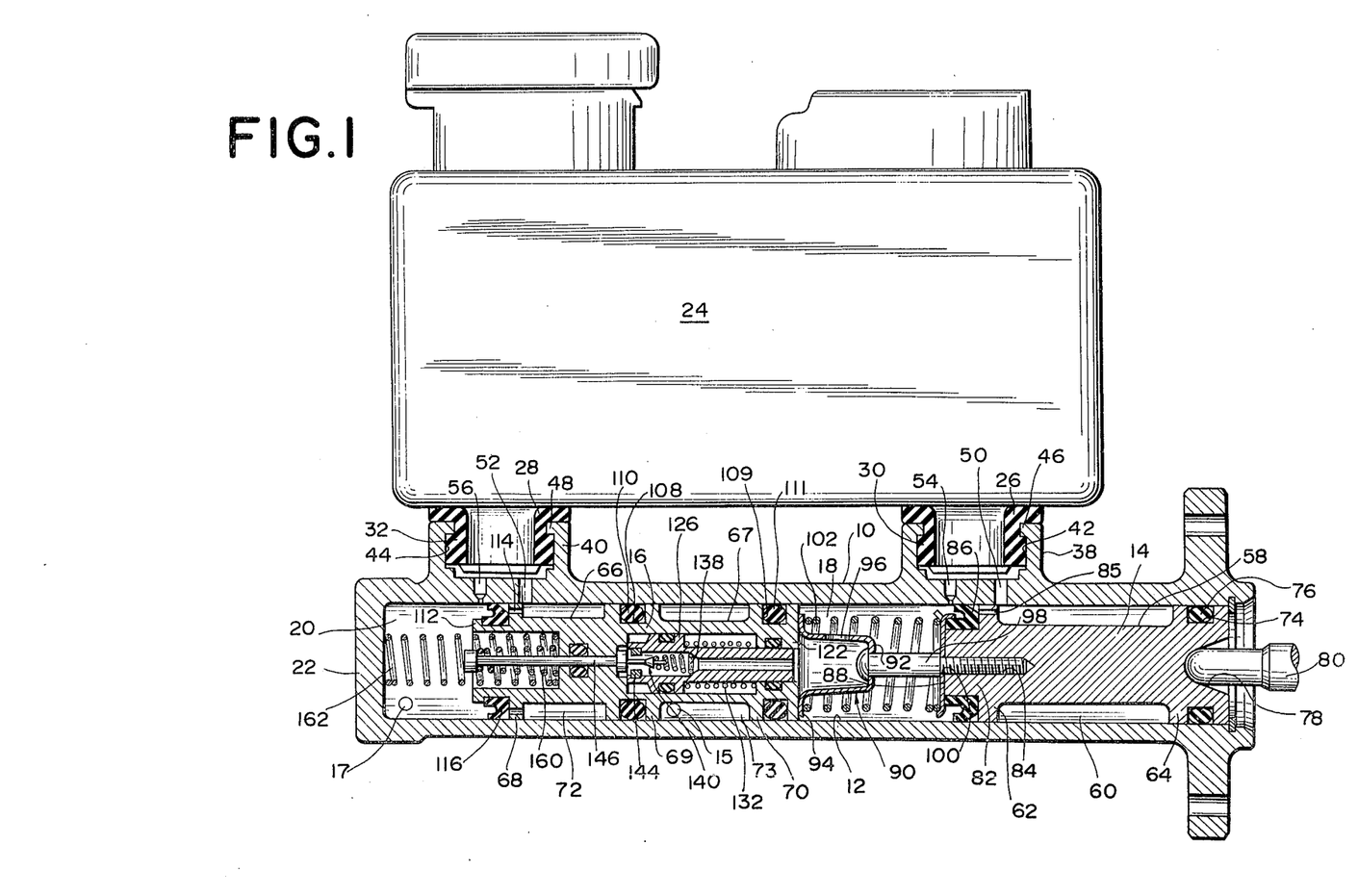
FIG. 1 is a longitudinal section of a preferred embodiment of a master cylinder according to the present invention.

Referring now to the drawings, particularly to FIG. 1, there is illustrated a preferred embodiment of a tandem piston master cylinder according to the present invention. The master cylinder comprises a cylinder housing 10 with a longitudinal 12 therein, which bore extends along a longitudinal axis of the housing 10. A primary piston 14 and a secondary piston 16 are respectively disposed within the bore 12 in spaced relationship. The primary and secondary pistons 14 and 16 define therebetween a primary pressure chamber 18 for establishing a hydraulic pressure which is applied to rear wheel cylinders via a primary port 15. The secondary piston 16 with an end 22 of the housing 10 define a secondary pressure chamber 20 for establishing a hydraulic pressure which is applied to the front wheel cylinders via a secondary port 17.

The cylinder housing 10 is connected to a fluid reservoir 24 for storing working fluid. The fluid reservoir 24 is provided with a pair of mounting tubes 26 and 28 protruding outwardly therefrom. Although not clearly shown in FIG. 1, the mounting tubes 26 and 28 correspond to partitioned chambers in the fluid reservoir 24 each of which supply fluid to one of the primary and secondary pressure chambers 18 and 20. The mounting tubes 26 and 28 have flange portions 30 and 32 respectively at the ends thereof. The mounting tubes 26 and 28 engage cylindrical projections 38 and 40 of the cylinder housing respectively with engagement effected by grooves 42 and 44 and inwardly projecting flanges 46 and 48. The fluid reservoir 24 communicates with the bore 12 in the cylinder housing 10 via ports 50 and 52 formed in the cylinder housing 10. Also, the fluid reservoir 24 communicates with the cylinder bore 12 via ports 54 and 56 formed in the cylinder housing.

The primary piston 14 has an annular recess 58 on the outer circumference thereof which, together with the internal periphery of the cylinder housing, defines a primary fluid chamber 60. The primary piston 14 also has a pair of flange sections 62 and 64 at each end thereof. Likewise, the secondary piston 16 has annular recesses 66 and 67 along outer circumference thereof defined between flange sections 68, 69 and 70. The annular recess 66 together with the internal periphery of the cylinder housing 10 defines a secondary fluid chamber 72. The annular recess 67 together with the internal periphery of the cylinder housing 10 defines a pressure regulating chamber 73. The pressure regulating chamber 73 communicates with a primary port 15 for supplying pressurized fluid to the rear wheel cylinders.

On the outer circumference of the flange section 64 of the primary piston 14, there is an annular recess 74 for receiving a sealing ring 76. The primary piston 14 also has a longitudinally extending bore 78 at the end adjacent the flange section 64. An input rod 80 for transmitting the force applied to a brake pedal (not shown) is received within the bore 78. On the end remote from the input rod 80, the primary piston 14 has a projecting portion 82 extending along the longitudinal axis thereof. At the center of the projecting portion, a threaded bore 84 is provided. In the flange section 62, a plurality of through openings 85 extending longitudinal direction along the longitudinal axis of the primary piston 14 are formed adjacent the circumference thereof. Opposing to the end of opening 85 toward the primary pressure chamber 18, an annular piston cup 86 is mounted which permits fluid flow from the primary fluid chamber 60 to the primary pressure chamber 18 but restricts fluid flow in the opposite direction.

On the projecting portion 82 of the primary pistin 14, a substantially disc-shaped spring seat 88 is mounted.

Another spring seat 90 is spaced opposite the spring seat 88. The spring seat 90 has a cup-shaped central portion 92 with a hole 93 and circumferential flange portion 94. The bottom of the central portion 92 is formed with an opening 96. A fastening screw 98 passes through the opening 93 and engages the threaded bore 84 in the projecting portion 82 through an opening 100 in the spring seat 88. Between the spring seats 88 and 90, a set spring 102 is disposed to urge the spring seat 90 and the primary piston 14 through the spring seat 88 apart.

The flange section 70 of the secondary piston has an annular recess 109 on the cirucmference thereof to receive a sealing ring 111. Likewise, the flange section 69 has an annular recess 108 on the circumference thereof to receive a sealing ring 110 therein. The secondary piston 16 has a projecting portion 112 extending in a longitudinal direction along the longitudinal axis thereof which faces the end 22 of the secondary pressure chamber 20. The flange section 68 has a plurality of through openings 114 extending parallel to the longitudinal axis of the secondary piston adjacent the circumference thereof. An annular piston cup 116 is mounted at the end of the through openings 114 facing the secondary pressure chamber 20, to permit fluid flow from the secondary fluid chamber 72 to the secondary pressure chamber 20 but to restrict fluid flow in the opposite direction.

Figure 2:
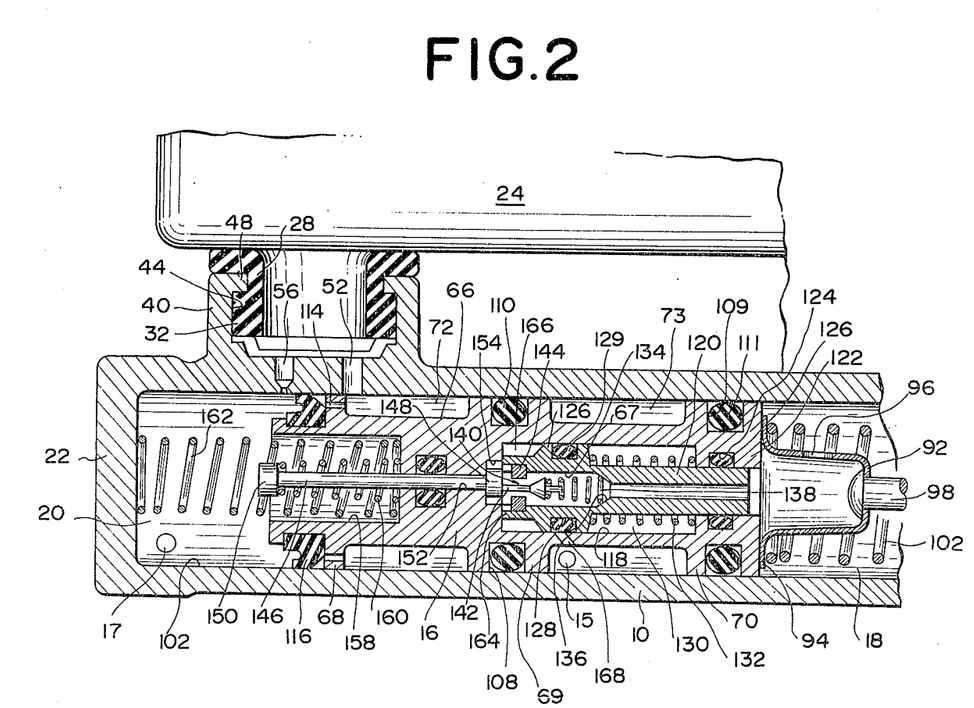
FIG. 2 is an enlarged sectional view of the secondary piston of FIG. 1.

As more clearly shown in FIG. 2, the secondary piston 16 has a longitudinal bore 118 extending axis thereof which opens in the primary pressure chamber 18. A thrusting cylinder 120 is slidably disposed within the longitudinal bore 118 in abutment with a guide section 122 which protrudes inwardly from the internal periphery of the bore at the open end of the bore. The guide section 122 is formed with an annular recess 124 on the internal circumference thereof for receiving an annular, liquid tight sealing ring 126. The thrusting cylinder 120 is provided with an external annular protrusion 126 adjacent an inner end thereof. The annular protrusion 126 is formed with an annular recess 128 for receiving therein a sealing ring 129. Thus, between the guide section 122 and the annular protrusion 126 there is defined annular spring chamber 130 in which a set spring 132 is disposed. The set spring 132 is a compression spring and normally urges the thrusting cylinder 120 toward the left as viewed in FIG. 2.

The thrusting cylinder 120 is formed with a stepped section 134 on the internal periphery thereof adjacent the inner end thereof. Against an inner periphery 136 of the step one end of a valve set spring 138 is seated. The other end of the valve set spring 138 engages a popet valve member 140 which has a longitudinally extending stem portion 142. The popet valve member 140 opposes a valve seat 144 on the internal periphery of the thrusting cylinder 120. The inner end of the stem portion 142 of the popet valve member 140 abuts against an actuation rod 146 having head portions 148 and 150. The actuation rod 146 is slidably disposed in a guide bore 152 extending axially through the secondary piston 16. The guide bore 152 communicates with the longitudinal bore 118 through a recess 154. The head 148 of the actuation rod 146 is normally within the recess 154 and contacts the inner end of the stem portion 142 of the popet valve member 140. The other end of the guide bore 152 communicates with a longitudinal bore 158 axially extending along the longitudinal axis of the secondary piston 16 and opening to the secondary pressure chamber 20. Between the bottom of the longitudinal bore 158 and the head 150 is disposed a set spring 160 to bias the actuation rod 146 toward the secondary pressure chamber 20. One end of a return spring 162, disposed within the secondary pressure chamber 20, is also seated within the longitudinal bore 158.

The thrusting cylinder 120 has a plurality of radially extending cut-outs 164 at the inner end thereof. The cut-outs 164 establish communication between the interior of the thrusting cylinder 120 and an annular space 166 between the outer circumference of the inner end of the thrusting cylinder 120 and the internal periphery of the longitudinal bore 118. Corresponding to the annular space 166, the secondary piston 20 is formed with a radially extending through opening 168 to communicate between the annular space 166 and the pressure regulating chamber 73.

In operation, when the brake pedal is in a released position, the relationship between the primary piston 14 and the secondary piston 16 with respect to the cylinder housing 10 is as shown in FIG. 1. In this position, the primary fluid chamber 60 communicates with the fluid reservoir 24 via the passage 26 and the inlet port 50. Likewise, the secondary fluid chamber 72 communicates with the fluid reservoir 24 via the passage pressure difference 44 and the inlet port 52. The primary pressure chamber 18 communicates with the fluid reservoir 24 via the relief port 54 and the secondary pressure chamber 20 communicates with the fluid reservoir 24 via the relief port 56.

Upon applying the brake pedal, pressure is applied to the primary piston 14 via the input rod 80. The primary piston 14 moves toward the primary pressure chamber 18. The primary piston 14 interrupts communication between the primary pressure chamber 18 and the fluid reservoir 24 via the relief port 54 during its motion toward the primary pressure chamber. Specifically, as the primary piston 14 travels to the left (FIG. 1), the relief port 54 is closed by the piston cup 86 and, the primary pressure chamber 18 is disconnected from the fluid reservoir 24. Further travel of the primary piston 14, results in increased fluid pressure in the primary pressure chamber thereby forcing the working fluid therein to flow through the thrusting cylinder 120 via the hole 93 of 96 in the spring seat 90. In this position, pressurized fluid flowing through the internal passage of the thrusting piston 120 flows through space between the poppet valve member 140 and the valve seat 144, the cut-outs 164, the annular space 166 and the radial through opening 168. Thus, the pressurized fluid is applied to the rear wheel cylinders via the pressure regulating chamber 73 and the primary port 15. The working fluid applied to the rear wheel cylinder urges the pistons in the rear wheel cylinder apart from one another thus applying the brakes.

Figure 3:
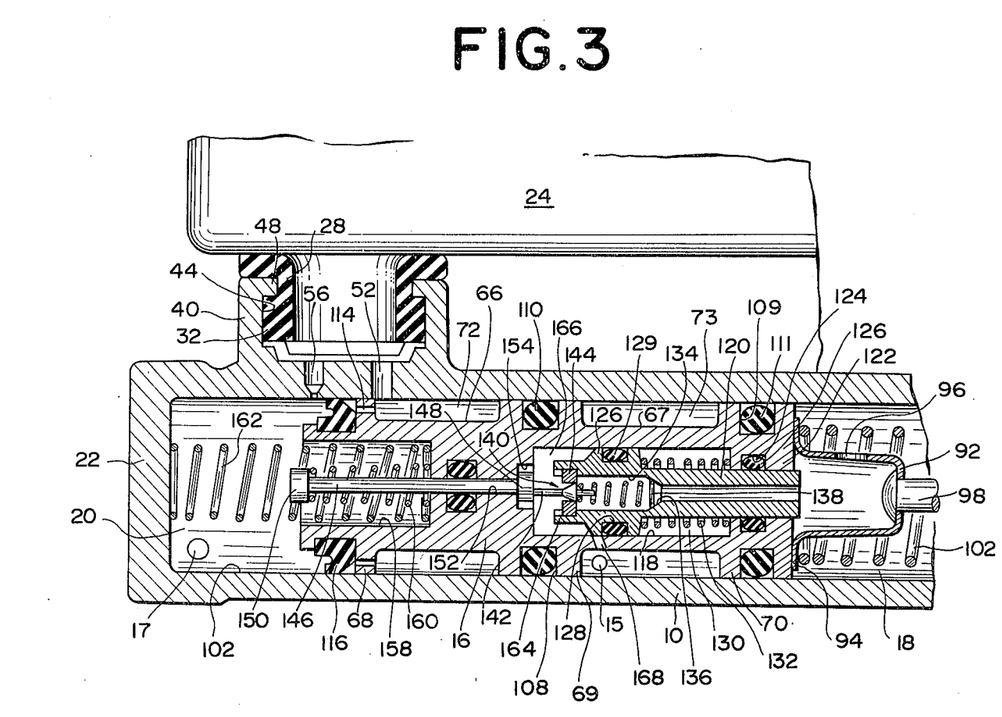
FIG. 3 is a similar view to FIG. 2 but showing a valve position for blocking fluid flow.

As shown in FIG. 3, the fluid pressure in the annular space 166 is also applied against the annular protrusion 126 to pushing the thrusting cylinder 120 toward the primary pressure chamber 18 (i.e. to the right in FIG. 3) against the force of the set spring 132. By the motion of the thrusting cylinder 18, the valve seat 144 moves to the right toward the poppet valve member 140 to reduce the flow space therebetween. However, since the input force applied to the primary piston 14 via the input rod 80 is relatively weak at this stage, the fluid pressure applied against the annular protrusion 126 and the poppet valve member 140 and the spring pressure from the set spring 132 is balanced to maintain a space between the poppet valve member 140 and the valve seat 144.

Corresponding to the motion of the primary piston 14 toward the primary pressure chamber 18, the fixed pressure in the primary pressure chamber increases to move the secondary piston 16 toward the secondary pressure chamber 20 thus increasing the pressure in the secondary pressure chamber 20.

During this movement, the piston cup 116 closes the compensation port 56 to disconnect the secondary pressure chamber from the fluid reservoir 24. In addition, the movement of the secondary piston 16 towards the secondary pressure chamber 20 results in the flange 68 of the secondary piston 14 sliding along the internal periphery of the cylinder bore 12 across the compensation port 56 to establish fluid communication between the secondary fluid chamber 72 and the fluid reservoir 24 via the compensation port 56. Fluid communication between the secondary pressure chamber and the fluid reservoir is then blocked and the volume of the secondary chamber 20 is reduced, resulting in an increase in the fluid pressure therein. As indicated above, the fluid pressure in the secondary pressure chamber 20 is fed to the front wheel cylinders via the secondary port 17.

By further application of the brake pedal, the primary and secondary pistons 14 and 16 travel toward the primary and secondary pressure chambers 18 and 20 respectively. Since the primary and secondary pressure chambers 18 and 20 are disconnected from the fluid reservoir 24, the fluid pressure in the primary and secondary pressure chambers 18 and 20 and, in turn, that applied to the rear and front wheel cylinders increases with the motion of the primary and secondary pistons 14 and 16 to the left. By increasing of the fluid pressure in the wheel cylinders, the pressure applied to the brake linings is increased to effect even braking. At this stage, the brake pressure applied to the rear and front wheel cylinders increases linearly, as represented by line a-b in FIG. 6.

Figure 4:
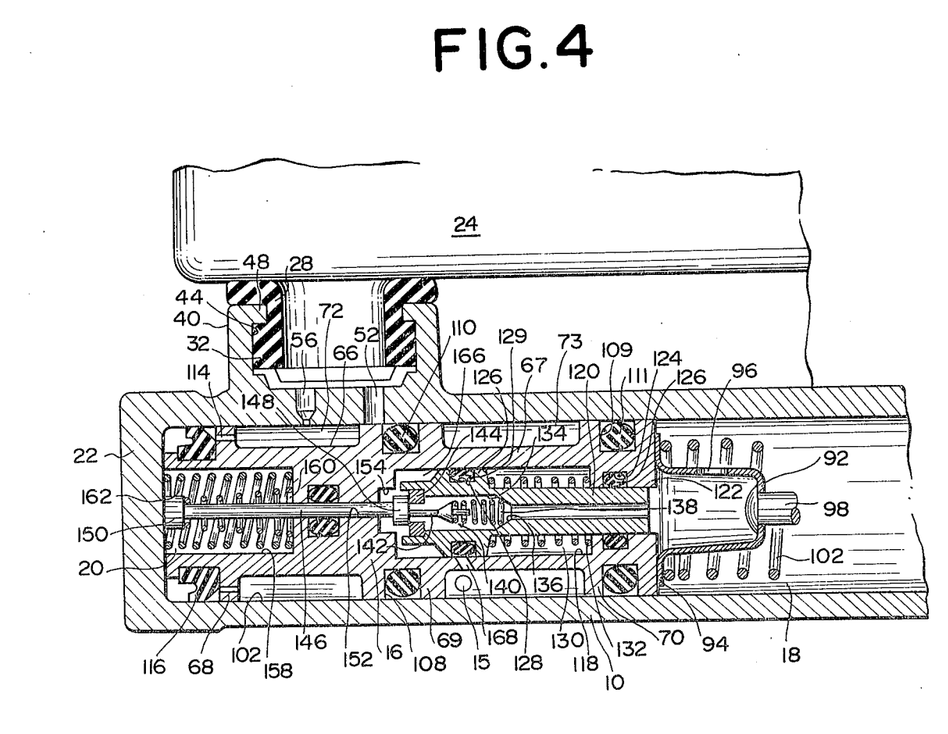
FIG. 4 is a similar view to FIG. 2 but showing a valve position when the hydraulic circuit for front wheel cylinders is damaged.
Figure 5:
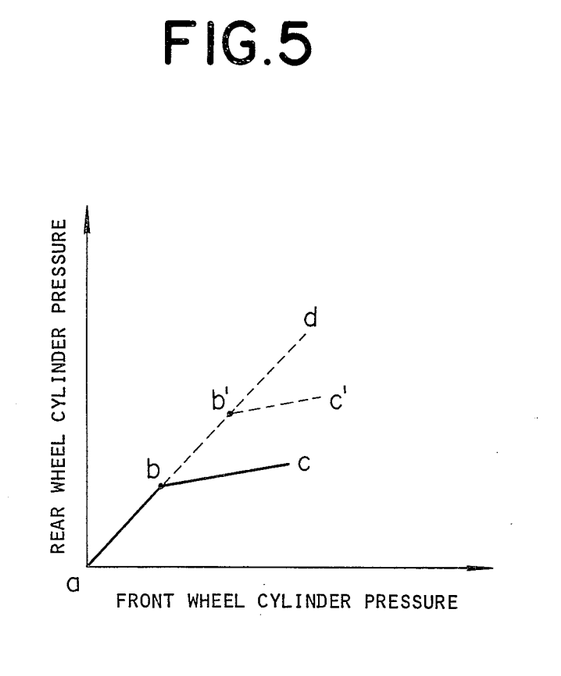
FIG. 5 is a graph showing the relationship between the brake pressures respectively applied to the rear wheel cylinder and the front wheel cylinder.

Corresponding to an increase in the brake pressure applied to the rear wheel cylinders, the fluid pressure applied to the annular protrusion 126 increases to further push the thrusting cylinder 120 to the right toward the primary pressure chamber 18. Therefore, the poppet valve member 140 becomes seated onto the valve seat 144 to block communication between the primary pressure chamber 18 and the pressure regulating chamber 73, as shown in FIG. 4. As shown in FIG. 5, from this point, the brake pressure applied to the rear wheel cylinders increases at a rate b-c smaller than the rate of increase for the front wheel cylinders. The split point b is defined by the sectional area of the poppet valve member 140 and the annular protrusion 126 and the pressure set by the set spring 132.

At the same time, the fluid pressure in the secondary pressure chamber 20 is continuously increased to build up greater brake pressure in the front wheel cylinders. Therefore, the brake pressures applied to the rear wheel cylinders and the front wheel cylinders at the split point b is preset to be even. Specifically, the brake pressure to the front wheel cylinders gradually increases corresponding to the depression of the brake pedal. Until the split point, the fluid pressure in the rear wheel cylinders also gradually increases corresponding to the depression of the brake pedal. However, when the fluid pressure in the pressure regulating chamber 73 exceeds the split point b, the poppet valve member 140 becomes seated onto the valve seat 144 and disconnects the pressure regulating chamber 73 from the primary pressure chamber 18. Thus, the fluid pressure in the pressure regulating chamber 73 is kept constant.

By further depressing the brake pedal, the primary piston 14 is further moved toward the primary chamber 18 thus reducing the volume of the primary chamber 18. Corresponding to the motion of the primary piston 14, the secondary piston 16 moved toward the secondary chamber 20 to establish a larger fluid pressure therein. Therefore, the fluid pressure in the secondary chamber 20 and in turn, the force applied by the front wheel cylinders increases according to the application of the brake pedal. Corresponding to an increase in the fluid pressure in the primary pressure chamber 18, the fluid pressure urging the thrusting cylinder 120 to the right becomes greater than that applied to the annular protrusion 126 by the set spring 132 to move the thrusting piston toward the end of the bore of the thrusting cylinder 120. The valve seat 144 moves together with the thrusting cylinder 120. Thus, the poppet valve member 140 unseats from the valve seat to permit pressurized fluid to flow therethrough. In response to this valve motion, the fluid pressure in the pressure regulating chamber 73 increases until the pressure applied to the annular protrusion 126 exceeds the pressure applied to the thrusting cylinder 120 to interrupt communication between the primary pressure chamber 18 and the pressure regulating chamber 73.

Therefore, the poppet valve member 140 operates to repeatedly open and close fluid flow therethrough. By this valve operation, the amount of fluid flowing into the pressure regulating chamber 73 and in turn applied to the rear wheel cylinder is limited whereby the brake force established in the rear wheel cylinder is smaller than that established for the front wheel cylinders.

Since the master cylinder according to the present invention can adjust the brake force applied to the rear wheel cylinder to be smaller than that applied to the front wheel cylinder it can prevent the rear wheels from skidding.

In addition, if the hydraulic circuit for the front wheels is damaged, for example due to vapor lock, no fluid pressure may be established in the secondary pressure chamber 20. In this case, in response to the depression of the brake pedal, the secondary piston moves toward the secondary pressure chamber 20 to reduce the volume thereof. Ultimately, the secondary piston 16 will abut the end 22 of the cylinder bore 12, making the volume of the secondary pressure chamber substantially zero. In this piston position, the head 150 of the actuation rod 146 abuts against the end 22 of the cylinder bore and is forced toward the thrusting cylinder 120. The actuation rod 146 pushes the poppet valve member 140, against the force of the spring 138, to unseat the valve member 140 from the valve seat 144. By spacing the poppet valve member 140 far from the valve seat 144, the split point of the fluid pressure is set higher as represented by b' in FIG. 5. Therefore, the greater brake force can be applied to the rear wheels to effecting braking operation.

Figure 6:
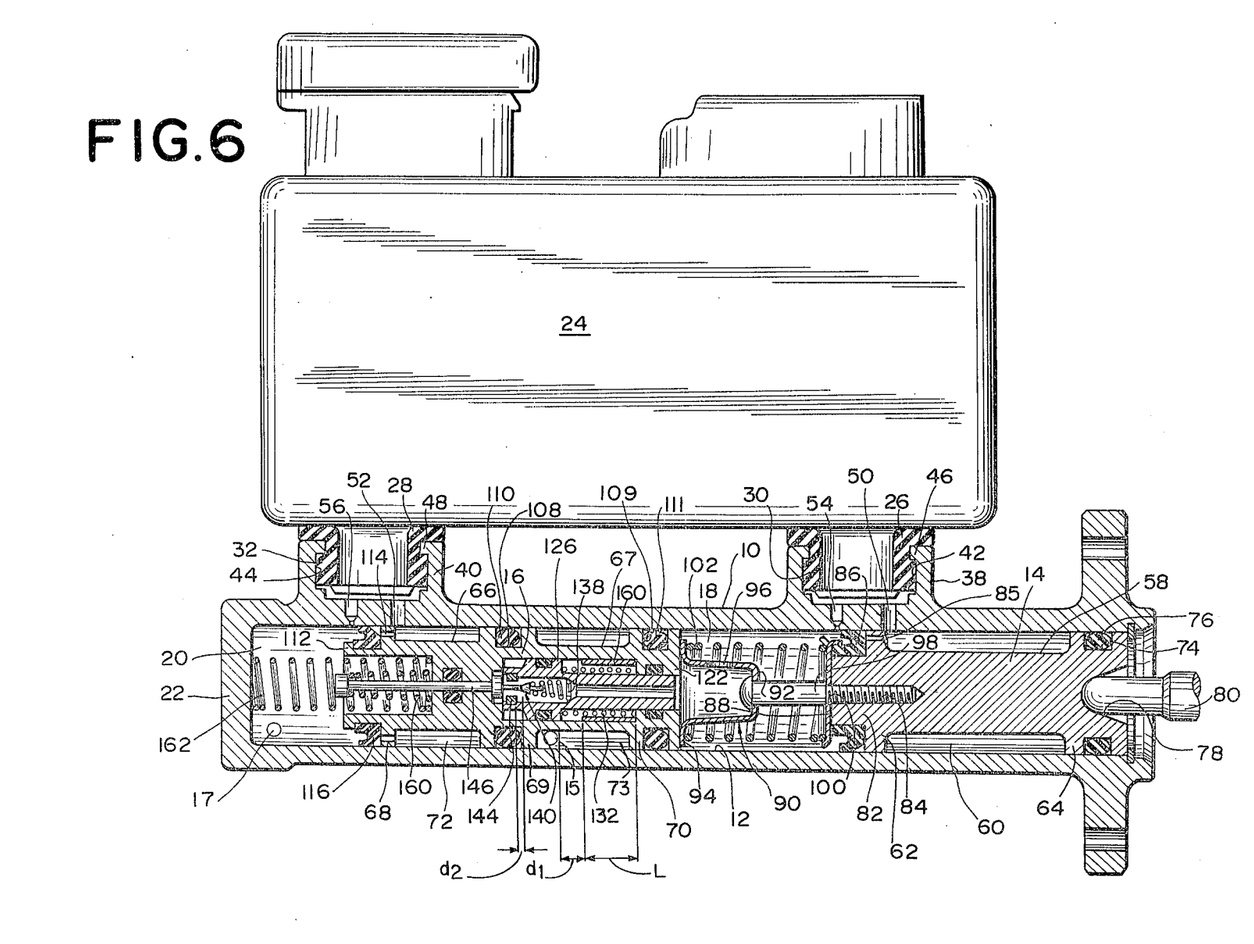
FIG. 6 is a longitudinal section of another embodiment of the master cylinder according to the present invention.

For assuring brake operation when the hydraulic circuit for the front wheel cylinders is damaged, communication between the pressure regulating chamber 73 and the primary pressure chamber 20 must be maintained. FIG. 6 illustrates a modification of the tandem master cylinder according to the present invention. In this modification, a cylindrical insert 161 is disposed within the secondary piston bore 18. The cylindrical insert 161 has an axial length L leaving a longitudinal space $d_1$ within the piston bore. The dimension of space $d_1$ is longer than the dimension $d_2$ between the poppet valve 140 and the valve seat 144 when the front brake hydraulic circuit is damaged.

Namely, in the normal position, the thrusting cylinder 120 can move freely within the bore 118 of the secondary piston 16 and therefore function to limit the fluid flow therethrough. In case the front brake hydraulic circuit is damaged, the motion of thrusting cylinder 120 is limited in the direction toward the primary pressure chamber by the insert 161 to maintain the space between the poppet valve member 140 and the valve seat to maintain fluid flow from the primary pressure chamber 18 to the pressure regulating chamber 73. Thereby, the fluid pressure to the rear wheel cylinders increases linearly as the brake pedal is depressed for effecting brake operation.

As mentioned above, the invention described hereinabove can fulfill the objects sought thereto.

What is claimed is:

1. A tandem master cylinder in a hydraulic brake system for an automotive vehicle comprising:

a cylinder housing having an axially extending bore therein;

primary and secondary pistons axially aligned within said cylinder housing bore in tandem relationship with each other for movement in response to application of a braking force;

primary and secondary pressure chambers defined within said bore by said primary and secondary pistons, said primary chamber being located between said primary and secondary pistons, and said secondary chamber being defined by an end of the cylinder housing bore and said secondary piston and communicating with respective front wheel cylinders via a single secondary port;

a fluid reservoir communicating with said primary and secondary pressure chambers for supplying working fluid thereto; and a single pressure control valve assembly provided in said secondary piston, said valve assembly including a bore formed in said secondary piston and extending along the longitudinal axis thereof, a thrustable cylinder having an axially extending opening therein and an annular projecting portion defining first and second chambers between the outer periphery of said thrusting cylinder and internal periphery of said secondary piston bore, a valve member and a valve seat incorporated with said thrusting cylinder for motion therewith, said first chamber communicating with said primary pressure chamber via said opening and a space between said valve member and said valve seat, said thrusting cylinder being movable between a first initial position wherein said valve seat is spaced from said valve member to permit fluid flow therethrough to establish fluid communication between said primary pressure chamber and said first chamber and a second position wherein said valve seat abuts said valve member for blocking fluid communication between said primary pressure chamber and said first chamber, said thrusting cylinder being responsive to the pressure difference between said first chamber and said primary pressure chamber for alternating the valve position between said first and second position; and a single primary port communicating with rear wheel cylinders, said primary port communicating with said first chamber through a radial passage formed in said secondary piston.

2. A tandem master cylinder for a hydraulic brake system of an automotive vehicle comprising:

a cylinder housing having an axially extending bore therein;

primary and secondary pistons axially aligned within said cylinder housing bore in tandem relationship and cooperative with each other for movement in response to application of a braking force;

primary and secondary pressure chambers defined within said bore by said primary and secondary pistons, said primary pressure chamber being positioned between said primary and secondary pistons and said secondary pressure chamber being positioned between an end of the bore and said secondary piston and adapted to communicate with front wheel cylinders via a single secondary port opening;

a fluid reservoir communicating with said primary and secondary pressure chambers for supplying working fluid thereto;

a single pressure control valve assembly, provided in said secondary piston, said valve assembly including a bore formed in said secondary piston and extending along a longidutinal axis thereof, a thrusting cylinder having an axially extending opening therein and an annular projecting portion which defines first and second pressure control chambers between the outer periphery of said thrusting cylinder and internal periphery of said secondary piston bore, a pressure control valve generally positioned at a fixed position by a set spring and a stopper, and a valve seat associated with the internal periphery of said opening of said thrusting cylinder for motion therewith; said first control chamber communicating with said primary pressure chamber via said opening and a space between said pressure control valve and said valve seat, said thrusting cylinder being movable between a first position wherein said valve seat is spaced from said pressure control valve for permitting fluid flow therethrough and a second position wherein said valve seat abuts said pressure control valve for blocking fluid flow, said thrusting cylinder being responsive to the fluid force in said first chamber and said opening for moving between said first and second positions; and a single primary port for communicating with rear wheel cylinders, said primary port communicating with said first pressure control chamber through a radial passage formed in said secondary piston.

3. A master cylinder as set forth in claim 2, wherein said thrusting cylinder is guided by an inwardly projecting annular portion protruding from the internal periphery of said secondary piston bore, said annular portion and said projecting portion of said thrusting cylinder defining a second chamber in which a set spring is disposed for providing an initial set pressure for said thrusting cylinder.

4. A tandem master cylinder for a hydraulic brake system of an automotive vehicle comprising:

a cylinder housing having an axially extending bore therein;

primary and secondary pistons axially aligned within said cylinder housing bore in tandem relationship and cooperative with each other for movement in response to application of a braking force; and primary and secondary pressure chambers defined within said bore by said primary and secondary pistons, said primary pressure chamber being positioned between said primary and secondary pistons and said secondary pressure chamber being defined by an end of the cylinder housing bore and said secondary piston and adapted to communicate with front wheel cylinders via a single secondary port opening;

a fluid reservoir communicating with said primary and secondary pressure chambers via first and second passages and communicating with primary and secondary fluid chambers defined between an internal periphery of said cylinder housing bore and outer peripheries of said primary and secondary pistons respectively via third and fourth passages for supplying working fluid thereto;

a single pressure control valve assembly provided in said secondary piston, said valve assembly including a bore formed in said secondary piston and extending along a longitudinal axis thereof, a thrusting cylinder having a longitudinally extending opening therein and an annular projecting portion projecting from the outer periphery of said thrusting piston, said projecting portion defining a pressure control chamber between the outer periphery of said thrusting cylinder and an internal periphery of said secondary piston bore, said projecting portion having a first cross-section facing said pressure control chamber which is larger than a second cross-section of said thrusting cylinder facing said primary pressure chamber, a pressure control valve and a valve seat opposing said pressure control valve and incorporated with said thrusting cylinder for movement therewith, said pressure control chamber communicating with said primary pressure chamber via said opening and said pressure control valve and said valve seat, said thrusting cylinder being movable between a first position wherein said valve seat is spaced from said pressure control valve for permitting fluid flow therethrough and a second position wherein said valve seat abuts said pressure control valve for blocking fluid flow, said thrusting cylinder being responsive to a pressure differential whereby when a fluid force applied to the first cross-section exceeds that applied to said second cross-section by a first predetermined value, the thrusting cylinder moves to block fluid flow through said pressure control valve and when the fluid force applied to said second cross-section exceeds that applied to said first section by a second predetermined value, said thrusting cylinder moves to establish fluid communication between said primary and pressure control chambers; and a single primary port adapted to communicate with rear wheel cylinders, said primary port communicating with said pressure control chamber through a radial passage formed in said secondary piston.

5. A master cylinder as set forth in claim 1, 2 or 4, wherein longitudinal motion of said thrusting cylinder is guided by an inwardly projecting annular portion protruding from the internal periphery of said secondary piston bore, said annular portion and said projecting portion defining a second chamber in which a set spring is disposed for providing an initial set pressure for said thrusting cylinder.

6. A master cylinder as set forth in claim 5, wherein said pressure control valve is normally urged toward a stopper which extends along a longitudinal axis of the secondary piston, the inner end thereof facing toward said end of the cylinder housing bore, the longitudinal motion of said stopper being limited by a through opening in said secondary piston for receiving the stopper and permitting motion thereof, one end of said through opening communicating with said secondary piston bore.

7. A valve assembly for a tandem master cylinder of a hydraulic brake system for an automotive vehicle, said master cylinder including primary and secondary pistons arranged in tandem relationship with respect to one another and cooperating to be moved by a brake pedal, said primary and secondary pistons being axially aligned and disposed within a bore extending along a longitudinal axis of a cylinder housing, said primary and secondary pistons defining primary and secondary pressure chambers respectively communicating with a fluid reservoir for receiving therefrom a working fluid and for supplying pressurized fluid to rear and front wheel cylinders of a brake system through a single primary and single secondary port respectively, a single valve assembly for regulating the hydraulic pressure applied to the rear wheel cylinders through said single primary port comprising:

a longitudinally extending bore formed in said secondary piston and communicating with said primary chamber;

a thrusting cylinder movably disposed with said secondary piston bore, said thrusting cylinder having an annular projecting portion on an outer periphery thereof in abutment with an internal periphery of said secondary piston bore, said projecting portion defining first and second chambers between said outer periphery of said thrusting cylinder and the inner periphery of said secondary piston bore, said first chamber communicating with said primary pressure chamber via a fluid passage formed within said thrusting cylinder;

a valve member disposed within said fluid passage;

a valve seat opposing to said valve member and cooperating with said thrusting cylinder for motion therewith;

a first spring urging said valve member towards said valve seat for providing said valve member with a set pressure;

an initial valve position setting means contacting said valve member and positioning the valve member at an initial position with respect to said valve seat for defining an initial space between said valve member and said valve seat;

a second spring biasing said thrusting cylinder toward a first position wherein said valve seat is spaced from said valve member for permitting fluid flow from said primary pressure chamber to said rear wheel cylinders through said single primary port;

whereby when a first hydraulic force acting against a first cross-section of said projecting portion of said thrusting cylinder facing said first chamber exceeds a force applied to a second cross-section of said thrusting cylinder facing said primary pressure chamber by a spring force of said second spring, said thrusting cylinder moves toward said valve member to block fluid communication between said primary pressure chamber and said first chamber; and whereby when a second hydraulic force, acting on said second cross-section, for biasing said thrusting cylinder towards said first position, exceeds said first hydraulic force acting on said first cross-section, said thrusting cylinder is operable to move to said first position.

8. A valve assembly as set forth in claim 7, wherein said initial valve position setting means comprises an actuating rod disposed within said secondary piston and having a head portion extending toward the secondary pressure chamber, said end portion normally extending a given distance from an end of the secondary piston opposing said end of the cylinder housing bore, said actuating rod being operable to define, a first valve position wherein a space between said valve member and said valve seat is a minimum and a second valve postiion in which said end portion contacts said head of the cylinder housing bore where said space is a maximum.

9. A valve assembly as set forth in claim 8, wherein said given distance defines a motion distance of said actuating rod for maintaining the space between said valve member and said valve seat even when said thrusting cylinder moves to said second position and said actuating rod is in said second position.

10. A valve assembly as set forth in claim 9, wherein a stopper is disposed within said second chamber for limiting the longitudinal motion of said thrusting cylinder, the limited distance within which said thrusting cylinder can move being shorter than said maximum space between said valve member and said valve seat in the second position of said actuating rod.

11. A master cylinder as set forth in claim 10, wherein said thrusting cylinder is guided by an inwardly projecting annular portion protruding from the internal periphery of said secondary piston bore and said annular portion and said projecting portion of said thrusting piston define the second chamber in which a set spring is disposed for providing an initial set pressure for said thrusting cylinders.

12. A master cylinder as set forth in claim 11, wherein said valve member is normally urged toward a stopper which extends along a longitudinal axis of the secondary piston, one end thereof facing the end of the cylinder housing bore, said stopper being operable to limit the longitudinal motion of the valve member in a through opening, said through opening being formed in said secondary piston, an outer end of which opens towards said secondary piston bore.

13. A master cylinder as set forth in claim 11, wherein an annular pressure regulating chamber is defined between the outer periphery of said secondary piston and inner periphery of said cylinder housing bore, said pressure regulating chamber being positioned between said first chamber and said primary port and communicating therewith via said radial passage formed in said secondary piston.

14. A tandem master cylinder for an automotive hydraulic brake system, comprising:

a fluid source;

a cylinder housing defining therein a fluid container bore;

primary and secondary pistons adapted to cooperate with a brake pedal and which define primary and secondary chambers respectively in said fluid container bore;

a first passage means including a single secondary port adapted to communicate between front wheel brake cylinders and said second chamber;

second passage means including means for defining a pressure regulator chamber in said secondary piston and means for defining a communication passage connecting said primary pressure chamber and said pressure regulator chamber, said second passage means including a single primary port adapted to communicate between said pressure regulator chamber and rear wheel brake cylinders;

a single pressure regulator valve disposed in said communication passage and having fluid pressure responsive first and second valve members for establishing and blocking fluid communication between said primary pressure chamber and said pressure regulator chamber via said communication passage, said second valve member being movable with respect to the first valve member to establish a first communicating position and a second blocking position;

first hydraulic means acting on said second valve member for moving said second valve member into said second blocking position when fluid force acting on a first portion of said second valve member, facing to said pressure regulator chamber, exceeds a fluid force acting on a second portion of said second valve member facing said primary pressure chamber, by a predetermined value; and second hydraulic means acting on said second valve member for moving said second valve member into said first communicating position when fluid force acting on said second portion becomes larger than fluid force acting on said first portion.

15. The master cylinder as set forth in claim 14, further comprising means for setting a position of said first valve member in relation to said secondary piston to maintain said first valve member at a set initial position, said position setting means being responsive to a secondary piston stroke exceeding a predetermined stroke to move said first valve member to shift the first valve member from said second valve member for maintaining fluid communication between said primary pressure chamber and said pressure regulator chamber.

16. The master cylinder as set forth in claim 14, wherein said first portion of said second valve member has a larger cross-sectional area than that of said second portion.

17. The master cylinder as set forth in claim 14, which further comprises a resilient means for providing an initial set pressure for said second valve member for maintaining said second valve member at said first communicating position, said initial pressure setting means providing said predetermined value of pressure.

18. A tandem master cylinder for a hydraulic brake system for an automotive vehicle comprising:

a cylinder housing having an axially extending bore therein;

primary and secondary pistons axially aligned and disposed within said cylinder housing bore and cooperating with each other for movement in response to an application of a braking force;

primary and secondary pressure chambers defined within said bore by said primary and secondary pistons, said primary chamber being located between said primary and second pistons, and said secondary chamber being positioned between an end of the cylinder housing bore and said secondary piston and adapted to communicate with front wheel brake cylinders via a single secndary port;

a fluid reservoir communicating with said primary and secondary pressure chambers for supplying working fluid thereto; and a single pressure control valve assembly provided in said secondary piston, said valve assembly including means for defining a pressure control chamber adapted to communicate with rear wheel brake cylinders via a single primary port and with said primary pressure chamber via a fluid passage, and a pressure control valve disposed within said fluid passage for establishing and blocking fluid communication between said primary pressure chamber and said pressure control chamber, said pressure cobntrol valve being responsive to fluid force in said pressure control chamber being higher than fluid force in said primary pressure chamber for blocking fluid communication and being responsive to fluid force in said primary pressure chamber being higher than fluid force of said pressure control chamber for establishing fluid communication.

* * * * *